(12) United States Patent
Chabaille et al.

(10) Patent No.: US 10,995,671 B2
(45) Date of Patent: May 4, 2021

(54) HOUSING OF A GASKET FOR A TURBOMACHINE INJECTOR

(71) Applicant: SAFRAN AIRCRAFT ENGINES, Paris (FR)

(72) Inventors: Christophe Chabaille, Levallois Perret (FR); Antoine Bissieres, Saint Medard en Jalles (FR); Lauranne Sophie Mottet, Toulouse (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 179 days.

(21) Appl. No.: 16/304,406

(22) PCT Filed: May 29, 2017

(86) PCT No.: PCT/FR2017/051326
§ 371 (c)(1),
(2) Date: Nov. 26, 2018

(87) PCT Pub. No.: WO2017/207901
PCT Pub. Date: Dec. 7, 2017

(65) Prior Publication Data
US 2019/0292990 A1    Sep. 26, 2019

(30) Foreign Application Priority Data
May 31, 2016   (FR) ...................................... 16 54942

(51) Int. Cl.
*F02C 7/232*   (2006.01)
*F23K 5/14*    (2006.01)
(Continued)

(52) U.S. Cl.
CPC ................ *F02C 7/232* (2013.01); *F02C 7/28* (2013.01); *F02C 9/263* (2013.01); *F23D 11/36* (2013.01);
(Continued)

(58) Field of Classification Search
CPC .. F02C 7/232; F02C 7/28; F02C 9/263; F23R 3/28; F23R 3/283; F23R 2900/00012;
(Continued)

(56) References Cited

U.S. PATENT DOCUMENTS

| 3,721,453 A * | 3/1973 | Likavec ................... F16J 15/16 |
| | | 277/507 |
| 4,923,173 A * | 5/1990 | Szymaszek ............... F16K 1/36 |
| | | 251/333 |

(Continued)

FOREIGN PATENT DOCUMENTS

| EP | 1 950 429 A1 | 7/2008 |
| FR | 2 921 113 A1 | 3/2009 |

(Continued)

OTHER PUBLICATIONS

U.S. Appl. No. 15/504,387, filed Feb. 16, 2017, Christophe Chabaille, et al.

(Continued)

*Primary Examiner* — Alain Chau
(74) *Attorney, Agent, or Firm* — Oblon, McClelland, Maier & Neustadt, L.L.P.

(57) ABSTRACT

An inlet body is for a fluid injector for a turbomachine. The inlet body includes a casing and an inlet nozzle, housed inside the casing, that serves as a seat for a mobile sealing member. The inlet nozzle includes a central duct for the fluid and an annular rim surrounding the central duct. The annular rim includes a housing for a gasket. The housing is defined by a bottom wall, an opening opposite the bottom wall, and two opposite walls which each extend between the bottom wall and the opening. The walls are tilted towards each other in the direction of the opening.

7 Claims, 4 Drawing Sheets

(51) Int. Cl.
  *F23R 3/28* (2006.01)
  *F23D 11/36* (2006.01)
  *F16J 15/32* (2016.01)
  *F16K 1/46* (2006.01)
  *F02C 7/28* (2006.01)
  *F02C 9/26* (2006.01)

(52) U.S. Cl.
  CPC ............... *F23K 5/14* (2013.01); *F23K 5/147* (2013.01); *F23R 3/28* (2013.01); *F23R 3/283* (2013.01); *F05D 2240/35* (2013.01); *F05D 2240/55* (2013.01); *F16J 15/32* (2013.01); *F16K 1/465* (2013.01); *F23K 2300/206* (2020.05); *F23N 2235/24* (2020.01); *F23R 2900/00012* (2013.01)

(58) Field of Classification Search
  CPC .. F23N 2235/12; F23N 2235/24; F23K 5/147; F23K 5/14; F16J 15/16; F16J 15/164; F16J 15/32; F16K 1/46; F16K 1/465; F05D 2240/55
  See application file for complete search history.

(56) References Cited

U.S. PATENT DOCUMENTS

| | | | | |
|---|---|---|---|---|
| 5,003,771 A * | 4/1991 | Kester | ............... | F02C 7/228 60/243 |
| 5,109,664 A * | 5/1992 | Kester | ............... | F02C 9/263 60/773 |
| 5,243,816 A * | 9/1993 | Huddas | ............... | F02B 77/04 60/39.094 |
| 5,277,023 A * | 1/1994 | Bradley | ............... | F02B 77/04 239/119 |
| 5,329,760 A * | 7/1994 | Bradley | ............... | F02B 77/04 60/779 |
| 5,406,798 A * | 4/1995 | Wiesner, Jr. | ............ | F02C 7/232 60/734 |
| 5,732,730 A * | 3/1998 | Shoemaker | ............ | G05D 7/014 137/118.06 |
| 5,918,628 A * | 7/1999 | Harding | ............... | F02C 7/232 137/497 |
| 7,469,712 B2 * | 12/2008 | Jansen | ............... | F02C 7/232 137/516.27 |
| 9,255,558 B2 * | 2/2016 | Burke | ............... | F16K 15/063 |
| 9,765,894 B2 * | 9/2017 | Thomson | ............... | F02C 7/232 |
| 9,857,080 B2 * | 1/2018 | Chabaille | ............... | F02C 7/232 |
| 2002/0059799 A1 * | 5/2002 | Lavie | ............... | F02C 7/232 60/714 |
| 2005/0029483 A1 | 2/2005 | Bancroft et al. | | |
| 2006/0130901 A1 | 6/2006 | Jansen | | |
| 2009/0289208 A1 | 11/2009 | Yonezawa et al. | | |
| 2015/0096301 A1 | 4/2015 | Chabaille et al. | | |
| 2016/0215891 A1 * | 7/2016 | Thomson | ............... | F23D 11/38 |

FOREIGN PATENT DOCUMENTS

FR   2921113 A1 *  3/2009  ............... F02C 7/22
FR   3 011 619 A1   4/2015

OTHER PUBLICATIONS

U.S. Appl. No. 15/544,175, filed Jul. 17, 2017, Jose Roland Rodrigues, et al.
International Search Report dated Sep. 18, 2017 in PCT/FR2017/051326 filed on May 29, 2017.
French Preliminary Search Report dated Feb. 15, 2017 in FR 16 54942 filed on May 31, 2016.

* cited by examiner

HOUSING OF A GASKET FOR A TURBOMACHINE INJECTOR

TECHNICAL FIELD

The invention relates to fluid injectors for a turbomachine of an aircraft, such as turbojet engines and turboprops. It relates in particular to injectors of the aeromechanical type.

PRIOR ART

The intake bodies of a fuel injector for a turbomachine with a known structure comprise a casing, an inlet nozzle which is accommodated inside the casing and configured to be used as a seat for a mobile stopper.

The inlet nozzle comprises a central pipe for the passage of fluid and an annular rim surrounding the central pipe. The annular rim comprises a housing for a gasket.

Said gasket has a tendency to come out of its housing at least partially, which can cause the blockage of the stopper in a closed position and stop the supply of fuel to the combustion chamber by the injector.

DESCRIPTION OF THE INVENTION

The invention aims to at least partially solve the problems encountered in the solutions of the prior art.

With regard to the latter the subject matter of the invention is an inlet body for injecting fluid for a turbomachine. The inlet body comprises a casing and an inlet nozzle accommodated inside the casing, the inlet nozzle being configured to be used as a seat for a mobile stopper.

The inlet nozzle comprises a central pipe for the fluid, and an annular rim surrounding the central pipe. The annular rim comprises a housing for a gasket.

The housing is delimited by a base wall, an opening opposite the base wall and two opposite walls, which each extend between the base wall and the opening.

According to the invention, the walls are inclined towards one another in the direction of the opening. The gasket is crimped into the housing by the walls which are inclined towards one another in the direction of the opening. The annular rim comprises an evacuation pipe leading into the housing and to the exterior of the inlet nozzle, the evacuation pipe being configured to evacuate fluid out of the housing.

The form of the housing according to the invention makes it possible to limit the chances of the gasket escaping from its housing. The risks of the stopper getting blocked in the closed position due to a displacement of the gasket are then reduced. The frequency of maintenance operations or having to replace the body of the injector can be reduced. The evacuation pipe makes it possible to evacuate fuel which would be introduced into the housing and which would tend to make the gasket come out.

The invention can comprise optionally one or more of the following features in combination with one another or singly.

Advantageously, the opening leads downstream of the inlet body, the opening being preferably directed in a direction substantially parallel to a longitudinal direction of the inlet body.

According to one feature the walls comprise an internal wall and an external wall which are spaced apart from one another at a distance equal at most to 70% of the maximum diameter of the gasket in radial direction in a longitudinal cross-section of the inlet body to close the housing, and/or the external wall is inclined at an angle between 15° and 25° relative to the longitudinal direction.

According to an advantageous embodiment the housing has a substantially trapezoidal form in a longitudinal cross-section of the inlet body, the opening being located substantially parallel to a base wall of the housing.

According to another advantageous embodiment, the evacuation pipe traverses an external edge of the annular rim.

Advantageously, at least one portion of the evacuation pipe extends in a direction substantially parallel to the longitudinal direction.

The flow of fluid is thus facilitated in the direction of the stopper.

According to one particular embodiment, at least one portion of the evacuation pipe is formed by a groove arranged on an external surface of the inlet nozzle.

This part of the evacuation pipe is easy to produce.

According to another feature, the inlet body comprises a sealing valve accommodated on the inside of the casing, the sealing valve comprising a stopper, the housing accommodating a gasket, the stopper being in mechanical contact with the gasket in a closed position of the stopper.

The invention also relates to a fluid injector comprising an inlet body as defined above.

The invention also relates to a turbomachine comprising an injector as defined above.

Lastly, the invention relates to a method for producing an inlet body as defined above or an injector as defined above. The method of production comprises a step of inserting a gasket in the housing and deforming the housing to incline the walls towards one another in the direction of the opening.

The housing is thus simple to form, in particular by cold-folding the walls.

BRIEF DESCRIPTION OF THE DRAWINGS

The present invention is explained in the following description of embodiments, which are given by way of example and are not restrictive, with reference to the attached drawings in which.

DETAILED DESCRIPTION OF PARTICULAR EMBODIMENTS

Identical, similar or equivalent parts of the different figures have been given the same reference numerals so as the facilitate the transition from one figure to the other.

Figures 1, 2:
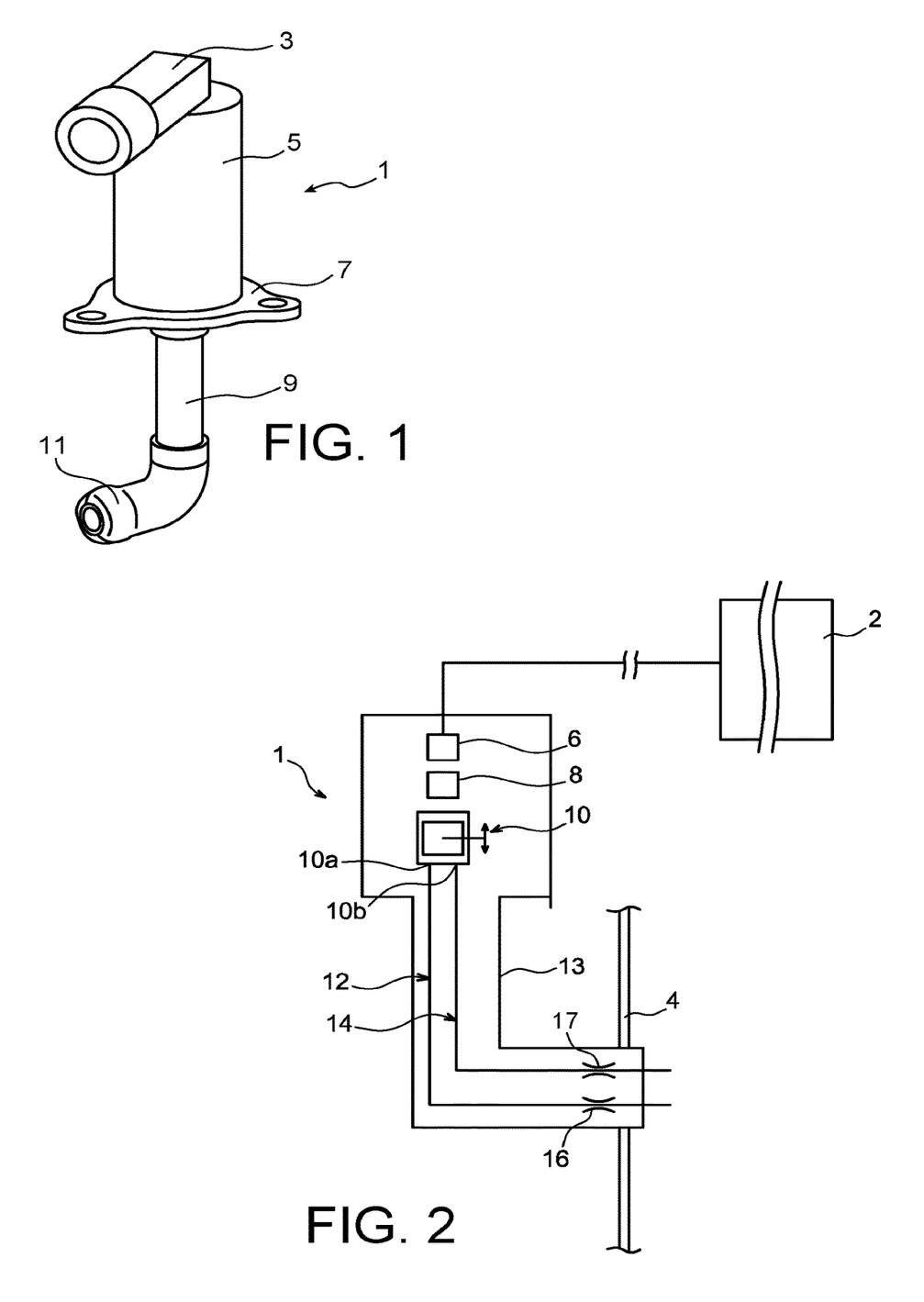
FIG. 1 is a partial schematic representation of a fuel injector of a turbomachine, according to a first embodiment of the invention.
FIG. 2 is a functional schematic representation of the injector according to the first embodiment, in a turbomachine.

FIG. 1 represents a fuel injector 1 for a turbomachine of an aircraft, according to a preferred embodiment of the invention.

The injector 1 is supplied with fuel from a reservoir 2 of the turbomachine. At its downstream end, the injector 1 passes through a base of the combustion chamber 4, in a manner known by a person skilled in the art.

In the present document, the terms "upstream" and "downstream" are used with reference to the flow direction of fuel in the injector 1 in the direction of the combustion chamber.

The injector 1 comprises an inlet body 3, a central body 5 into which the inlet body 3 leads, a fixing plate 7 for fixing the injector 1 to a wall of the combustion chamber, an injection unit 9, and an injector nose 11 located in the proximity of the distal end of the injection unit 9.

The injector 1 comprises, from upstream to downstream, a sealing valve 6, a diaphragm 8 and a metering device 10. The device 10 comprises a first outlet for fuel 10a and a second outlet for fuel 10b different from the first outlet 10a. The first outlet 10a supplies a primary fuel circuit 12, whereas the second outlet 10b supplies a secondary fuel circuit 14, designed for the circulation of larger flows in the direction of the combustion chamber.

The primary circuit 12 comprises a primary swirl 16, from the English "to swirl", for rotating the fuel for the purpose of atomisation. The secondary circuit 14 comprises a secondary swirl 17.

The sealing valve 6, the diaphragm 8, the metering device 10, the primary circuit 12 and secondary circuit 14 are arranged on the inside of a casing 13 delimiting the injector 1.

Figure 3:
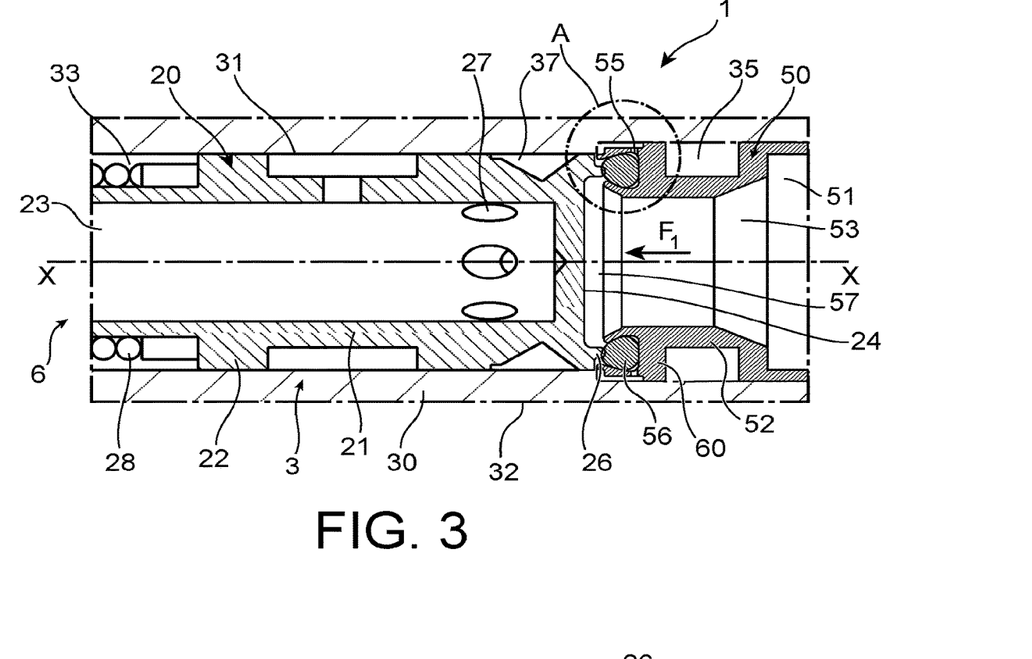
FIG. 3 is a partial schematic representation in longitudinal cross-section of an inlet body of the injector according to the first embodiment, when the stopper of the injector is in a closed position.
Figure 4:
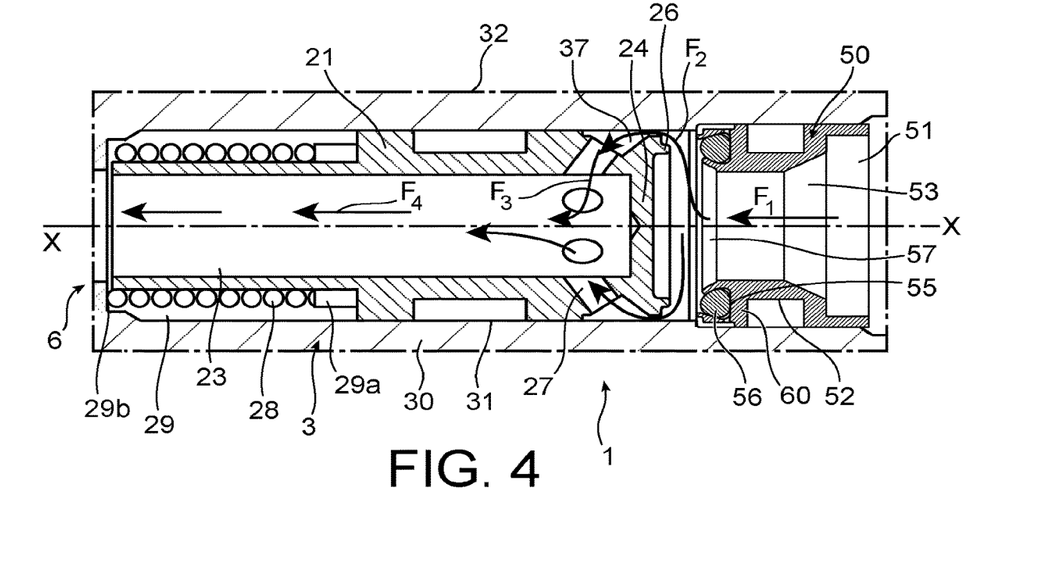
FIG. 4 is a partial schematic representation in longitudinal cross-section of an inlet body of the injector according to the first embodiment, when the stopper of the injector is in an open position.

With joint reference to FIGS. 3 and 4, the inlet body 3 is substantially annular around a longitudinal axis X-X.

In the following description, a direction parallel to the direction of the longitudinal axis X-X is referred to as the axial direction, a direction orthogonal to the axial direction is referred to as the radial direction.

The inlet body 3 is delimited by a casing 30 which forms part of the external casing 13 of the injector 1. The inlet body 3 houses the sealing valve 6 on the interior of the casing 30. Said valve 6 comprises a stopper 20, a spring 28 and an inlet nozzle 50.

The casing 30 comprises an internal surface 31 and an external surface 32 opposite the internal surface 31.

The internal surface 31 is substantially cylindrical with a circular cross-section. It delimits radially to the exterior a housing space 33 of the stopper and a housing space 35 of the inlet nozzle.

The housing spaces 33 and 35 have substantially the same radius, said radius corresponds to the distance between the longitudinal axis X-X and the internal surface 31.

The external surface 32 is substantially cylindrical with a circular cross-section, being concentric to the internal surface 31.

The stopper 20 comprises a body 21, an inner pipe 23 on the inside of the body 21, and admission pipes 27 which lead into the inner pipe 23.

The stopper 20 is mobile on the inside of the casing 30. It is designed to be open when the pressure of the fuel is greater than a first threshold. It is designed to be closed if the pressure of the fuel is lower than this first threshold.

The stopper 20 forms a valve for admitting fuel into the central body 5 of the injector 1. It is also known as a "inlet valve". In particular, the stopper 20 is of the "all or nothing" type: it only has a single stable position in an open position and a single stable position in a closed position.

The body 21 of the stopper 20 comprises an annular wall 22, a base wall 24 and a contact edge 26.

The base wall 24 closes the stopper 20 upstream. Said base wall 24 is surrounded by the annular contact edge 26.

The contact edge 26 is designed to come into contact with a gasket 56 of the inlet nozzle 50, in a closed position of the stopper 20.

The annular wall 22 is substantially cylindrical with a circular cross-section. It delimits with the internal surface 31 an annular housing cavity 29 of the spring 28. Said cavity 29 is delimited in axial direction by a first stop 29a formed by the annular wall 22 and by a second stop 29b formed by the casing 30.

The spring 28 is a compression spring which is configured to stress the stopper 20 in the direction of its closed position. The spring 28 is for example a helicoidal spring.

The inner pipe 23 is formed on the inside of the body 21. It is located in the central part of the body 21. It is used to channel fuel through the stopper 20, in the direction of the nose of the injector 11.

Each admission pipe 27 has the form of a channel which extends between an intermediate space 37 and the inner pipe 23.

The admission pipes 27 are distributed at angles through the body 21 of the stopper 20. The admission pipes 27 are each inclined downstream in relation to the longitudinal direction to facilitate the flow of fuel in the direction of the combustion chamber.

The intermediate space 37 is delimited radially to the exterior by the internal surface 31 of the casing.

It is delimited radially to the interior by the stopper 20 in a closed position of the stopper 20. It is delimited only partially radially to the exterior in an open position of the stopper 20.

The intermediate space 37 is used to connect the inlet nozzle 50 fluidically to the stopper 20 in an open position of the stopper 20. It has no fluid communication with the inlet nozzle 50 in a closed position of the stopper 20.

The inlet nozzle 50 comprises an annular body 52 which is traversed at its two opposite ends in axial direction by an inlet 51 and an outlet 57. The inlet nozzle 50 comprises a central pipe 53 which extends from its inlet 51 to its outlet 57 in the longitudinal direction.

The inlet 51 of the inlet nozzle 50 leads to the exterior of the injector 1. The outlet 57 of the inlet nozzle 50 leads into the intermediate space 37.

The body 52 comprises an annular rim 60 close to the outlet 57 in longitudinal direction. The annular rim 60 delimits a housing 55, in the form of a recess, for accommodating a gasket 56. Said gasket 56 is for example an O-ring.

The gasket 56 is designed to come into contact with the contact edge 26 of the stopper 20 in a closed position of the stopper 20, to prevent the flow of fuel between the outlet 57 and the inner pipe 23. The inlet nozzle 50 thus acts as a seat for the stopper 20, in a closed position of the stopper 20, as shown in FIG. 3.

The gasket 56 has no contact with the contact edge 26, when the stopper 20 is in an open position, as shown in FIG. 4. In this case, the gasket 56 is at a distance from the contact edge 26, so that fuel can flow from the outlet 57 of the inlet nozzle 50 into the intermediate space 37 before rejoining the inner pipe 23 of the stopper 20.

Figure 5:
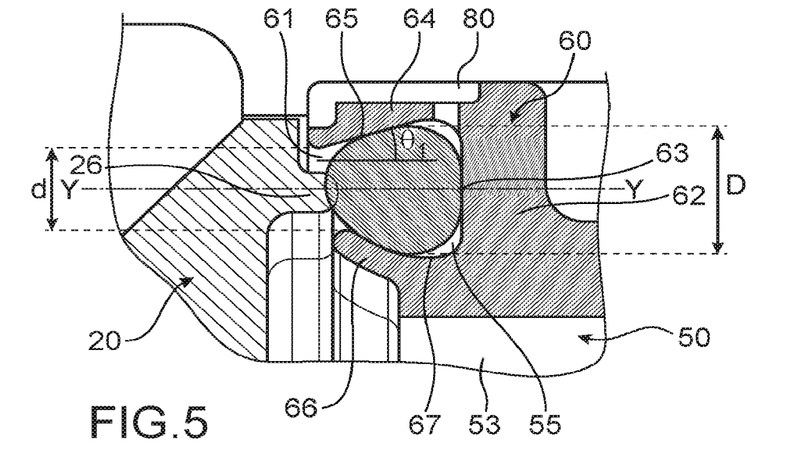
FIG. 5 is an enlarged view of detail A shown in FIG. 3.
Figure 6:
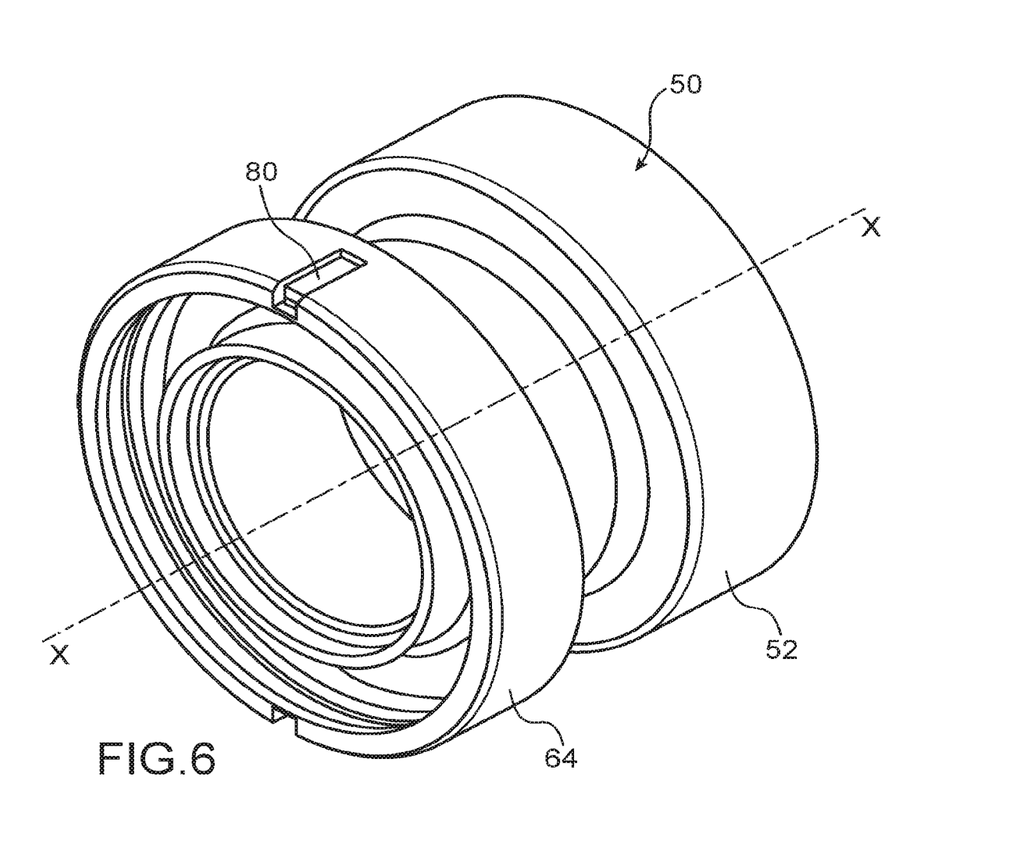
FIG. 6 is a perspective view of an inlet nozzle of the injector according to the first embodiment.
Figure 7:
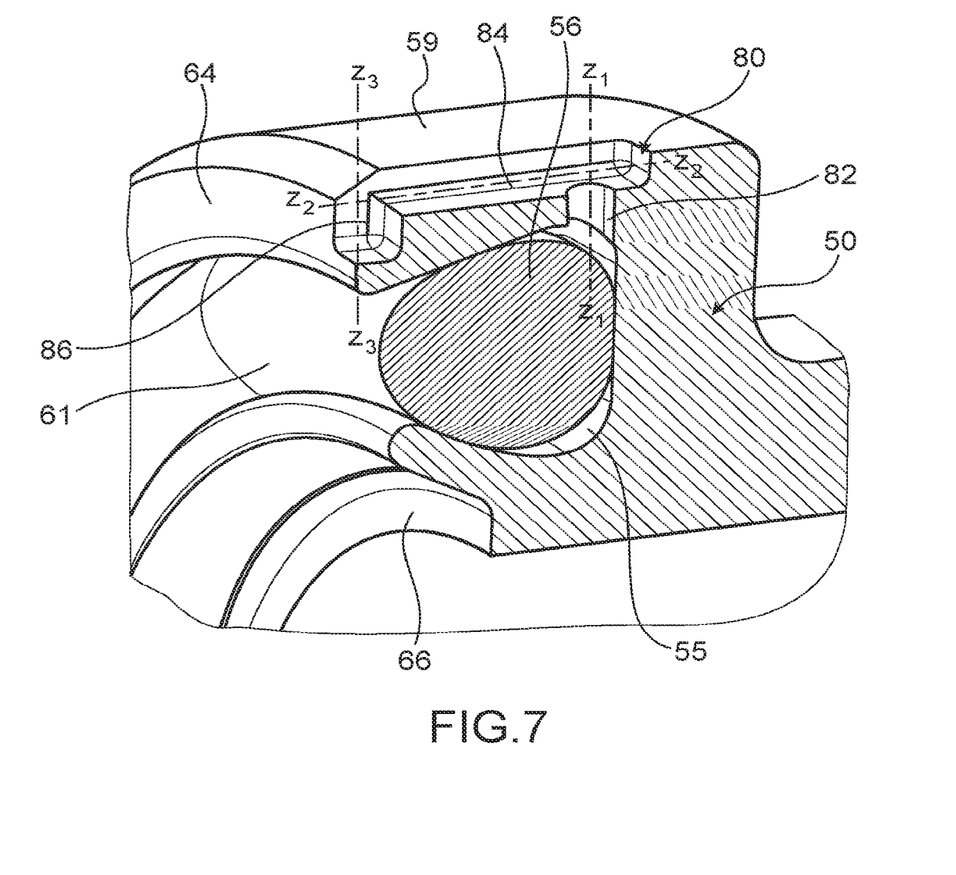
FIG. 7 is a partial view in elevation of the inlet nozzle of the injector according to the first embodiment.

With reference to FIGS. 5 to 7, the annular rim 60 of the inlet nozzle 50 comprises an upstream edge 62 projecting radially towards the outside of the body 52, an external edge 64 and an internal edge 66 opposite to the external edge 64.

The upstream edge 62 connects mechanically the internal edge 66 and the external edge 64 upstream of the housing 55. The internal edge 66 and the external edge 64 both extend downstream from the upstream edge 62. The external edge 64 is located radially towards the exterior relative to the internal edge 66. The internal edge 66 and the external edge 64 delimit jointly downstream an opening 61 of the housing.

The housing 55 is delimited by a base wall 63 of the upstream edge 62, an external longitudinal wall 65 of the external edge 64, and an internal longitudinal wall 67 of the internal edge 66. The base wall 63 is opposite the opening 61 in the longitudinal direction. The two opposite walls 65, 67 each extend between the base wall 63 and the opening 61.

The housing 55 extends substantially over the whole circumferential length of the annular rim 60, that is substantially over the whole circumferential length of the inlet nozzle 50.

The housing 55 has a substantially trapezoidal form in the longitudinal cross-section of the inlet body 3, the opening 61 being substantially parallel to the base wall 63 of the housing 55.

The opening 61 is opened downstream in a direction Y-Y substantially parallel to a direction of the longitudinal axis X-X.

The external wall 65 is inclined by an angle $\theta_1$ of between 15° and 25° relative to the longitudinal direction X-X.

The internal wall 67 is inclined relative to the longitudinal direction X-X by being spaced apart by a distance d which is equal to at most 70% of the maximum diameter D of the gasket 56 in a radial direction for closing the housing 55.

The walls 65 and 67 are inclined towards one another downstream, in the direction of the opening 61 of the housing 55. The opening 61 is thus preferably plugged by the walls 65, 67, which makes it possible to hold the gasket 56 in the housing 55 more effectively.

The annular rim 60 also comprises an evacuation pipe 80 which opens into the housing 55 through the external wall 65. The evacuation pipe 80 also leads to the exterior of the inlet nozzle 50.

The evacuation pipe 80 makes it possible to evacuate outside of the housing 55 any fuel which has penetrated the latter and which would be behind the gasket 56. Due to this pipe the fuel in the housing 55 is less at risk of pushing the gasket 56 out of the housing 55.

With reference to FIG. 6, the inlet nozzle 50 comprises only two evacuation pipes 80 which are diametrically opposite one another relative to the longitudinal axis X-X of the inlet body 3.

With reference more specifically to FIG. 7, each evacuation pipe 80 comprises a first channel 82, a second channel 84 and a third channel 86.

The first channel 82 extends substantially in radial direction $Z_1$-$Z_1$ from the external wall 65 to the second channel 84. The second channel 84 extends in a direction $Z_2$-$Z_2$ which is substantially parallel to the longitudinal direction X-X from upstream of the first channel 82 to the third channel 86. The third channel 86 extends in a direction $Z_3$-$Z_3$ which is substantially radial and substantially parallel to the orientation of the first channel 82.

The second channel 84 has the form of a groove formed in an external surface 59 of the inlet nozzle 50.

The production of the inlet nozzle 3 is explained in the following.

The inlet nozzle 50 is firstly formed so that the external wall 65 is inclined relative to the angle $\theta_1$ and the internal wall 67 is substantially parallel to the longitudinal direction X-X. The two walls 65, 67 then define between them a larger opening 61 than that of the inlet nozzle 50 which is represented in FIG. 3.

The gasket 56 is then inserted into its housing 55. The internal edge 66 is then deformed plastically such that the external wall 65 and the internal wall 67 approach one another downstream. The opening 61 is then partially sealed, from the approach towards one another of the walls 65, 67, which makes it possible to hold the gasket 56 in its housing 55. The gasket 56 is then crimped into its housing 55.

The first channel 81 and the third channel 86 are preferably obtained by piercing the inlet nozzle 50 from the exterior of the inlet nozzle 50. The second channel 84 is formed by a groove of the external surface 59 of the inlet nozzle 50. The evacuation pipe 80 is then easy and relatively inexpensive to produce.

The displacement of the stopper 20 between its closed position represented in FIG. 3 to its open position represented in FIG. 4 is explained below.

In FIG. 3, the stopper 20 is in a closed position. The pressure of fuel on the base wall 24 of the stopper is lower than the threshold of opening of the stopper 20, i.e. the first threshold.

The contact edge 26 of the stopper 20 is in mechanical contact with the gasket 56. The intermediate space 37 is integrally closed radially towards the interior by the annular wall 22 of the stopper 20. The stopper 20 prevents the fuel arriving with the flux $F_1$ into the injector 1 from flowing to the intermediate space 37.

In FIG. 4, the stopper 20 is in an open position. The pressure of the fuel on the base wall 24 of the stopper has become greater than the first threshold.

The contact edge 26 is further away from the inlet nozzle 50, so as to be without direct mechanical contact with the gasket 56. The intermediate space 37 is only partially sealed radially towards the interior by the annular wall 22.

The fuel which arrives with flux $F_1$ into the injector 1 traverses the central pipe 53, it flows through the outlet 57 of the inlet nozzle 50 into the intermediate space 37 with flux $F_2$.

The fuel in the intermediate space 37 continues to flow downstream through the admission pipes 27 into the inner pipe 23 with flux $F_3$. The fuel in the inner pipe 23 flows finally downstream with flux $F_4$ in the direction of the metering device 10 of the injector 1.

Of course, various modifications can be applied by the person skilled in the art to the invention described above without departing from the scope of the description of the invention.

In particular, the housing 55 can have a different shape other than a trapezoidal form in longitudinal cross-section of the inlet body 3.

The annular rim 60 and the gasket 56 can extend over only a portion of the circumferential length of the body 52 of the inlet nozzle 50.

In a similar manner one of the evacuation pipes 80 could extend over a greater circumferential length of the inlet body 3. The number and the angular distribution of the evacuation pipes around the longitudinal axis X-X can vary.

The form, the number and inclination of the evacuation channels 82, 84, 86 of each evacuation pipe 80 is also susceptible to variation.

For example, at least one of the evacuation pipes 80 can comprise only a single channel 82 inclined downstream relative to the longitudinal direction and leading into the housing 55 through the external wall 65.

The invention claimed is:

1. A fuel injector for a turbomachine, the fuel injector comprising, from upstream to downstream:
   a sealing valve;
   a diaphragm; and
   a metering device,
   wherein the fuel injector further comprises from upstream to downstream an inlet body, a central body into which the inlet body leads, a fixing plate for fixing the fuel injector to a wall of a combustion chamber, an injection unit, and an injector nose located near a distal end of the injection unit,
   wherein the fuel injector further comprises an external casing delimiting the fuel injector towards an outside of the fuel injector,
   wherein the inlet body houses the sealing valve inside the external casing,
   wherein the sealing valve comprises a stopper, a spring, and an inlet nozzle,
   wherein the spring stresses the stopper towards a closed position of the stopper,
   wherein the inlet nozzle is a seat for the stopper,
   wherein the stopper comprises a body, an inner pipe on an inside of the body, and admission pipes which lead into the inner pipe through the body of the stopper,
   wherein the body of the stopper comprises an annular wall, a base wall, and an annular contact edge,
   wherein the base wall closes the stopper upstream, and the base wall is surrounded by the contact edge,
   wherein the contact edge contacts a gasket when the stopper is in the closed position,
   wherein each admission pipe is a channel which extends between an intermediate space and the inner pipe,
   wherein the admission pipes are distributed at angles through the body of the stopper,
   wherein the admission pipes are each inclined downstream in relation to a longitudinal direction of the inlet body,
   wherein the intermediate space is delimited radially to an exterior by an internal surface of the external casing,
   wherein the intermediate space is delimited radially to an interior by the stopper in the closed position of the stopper,
   wherein the intermediate space connects fluidically the inlet nozzle to the stopper in an open position of the stopper,
   wherein the intermediate space has no fluid communication with the inlet nozzle in the closed position of the stopper,
   wherein the inlet nozzle comprises an annular body which is traversed at two opposite ends thereof in an axial direction by an inlet and an outlet, and a central pipe which extends from the inlet to the outlet in the longitudinal direction of the inlet body,
   wherein the inlet of the inlet nozzle leads to the exterior of the fuel injector,
   wherein the annular body of the inlet nozzle comprises an annular rim which surrounds the central pipe and which delimits a housing for accommodating the gasket,
   wherein the housing is delimited by a base wall, an opening opposite the base wall, and two opposite walls which each extend between the base wall and the opening,
   wherein the gasket is crimped into the housing by the two opposite walls which are inclined towards one another in the direction of the opening,
   wherein the two opposite walls are spaced apart by a distance which is equal to at most 70% of a maximum diameter of the gasket in a radial direction in longitudinal cross-section of the inlet body, to close the housing,
   wherein the annular rim comprises an evacuation pipe opening into the housing and to the exterior of the inlet nozzle,
   wherein the evacuation pipe is configured to evacuate fluid out of the housing,
   wherein at least a portion of the evacuation pipe extends in a direction parallel to the longitudinal direction of the inlet body,
   wherein the portion of the evacuation pipe is formed by a groove arranged on a radially outwardly facing external surface of the inlet nozzle, and
   wherein the groove faces the internal surface of the external casing.

2. The fuel injector according to claim 1, wherein an external wall of the two opposite walls is inclined at an angle between 15° and 25° relative to the longitudinal direction.

3. The fuel injector according to claim 1, wherein the housing has a substantially trapezoidal form in longitudinal cross-section of the inlet body, and wherein the opening is positioned substantially parallel to the base wall of the housing.

4. The fuel injector according to claim 1, wherein the evacuation pipe traverses an external edge of the annular rim.

5. A method for production of a fuel injector for a turbomachine,
   the fuel injector comprising, from upstream to downstream:
   a sealing valve;
   a diaphragm; and
   a metering device,
   wherein the fuel injector further comprises from upstream to downstream an inlet body, a central body into which the inlet body leads, a fixing plate for fixing the fuel injector to a wall of a combustion chamber, an injection unit, and an injector nose located near a distal end of the injection unit,
   wherein the fuel injector further comprises an external casing delimiting the fuel injector towards an outside of the fuel injector,
   wherein the inlet body houses the sealing valve inside the external casing,
   wherein the sealing valve comprises a stopper, a spring, and an inlet nozzle,
   wherein the spring stresses the stopper towards a closed position of the stopper,
   wherein the inlet nozzle is a seat for the stopper,
   wherein the stopper comprises a body, an inner pipe on an inside of the body, and admission pipes which lead into the inner pipe through the body of the stopper,
   wherein the body of the stopper comprises an annular wall, a base wall, and an annular contact edge,
   wherein the base wall closes the stopper upstream, and the base wall is surrounded by the contact edge,
   wherein the contact edge contacts a gasket when the stopper is in the closed position,
   wherein each admission pipe is a channel which extends between an intermediate space and the inner pipe,
   wherein the admission pipes are distributed at angles through the body of the stopper, wherein the admission pipes are each inclined downstream in relation to a longitudinal direction of the inlet body, wherein the intermediate space is delimited radially to an exterior by an internal surface of the external casing, wherein the intermediate space is delimited radially to an interior by the stopper in the closed position of the stopper, wherein the intermediate space connects fluidically the inlet nozzle to the stopper in an open position of the stopper, wherein the intermediate space has no fluid communication with the inlet nozzle in the closed position of the stopper, wherein the inlet nozzle comprises an annular body which is traversed at two opposite ends thereof in an axial direction by an inlet and an outlet, and a central pipe which extends from the inlet to the outlet in the longitudinal direction of the inlet body, wherein the inlet of the inlet nozzle leads to the exterior of the fuel injector, wherein the annular body of the inlet nozzle comprises an annular rim which surrounds the central pipe and which delimits a housing for accommodating the gasket, wherein the housing is delimited by a base wall, an opening opposite the base wall, and two opposite walls which each extend between the base wall and the opening, wherein the gasket is crimped into the housing by the two opposite walls which are inclined towards one another in the direction of the opening, wherein the two opposite walls are spaced apart by a distance which is equal to at most 70% of a maximum diameter of the gasket in a radial direction in longitudinal cross-section of the inlet body, to close the housing, wherein the annular rim comprises an evacuation pipe opening into the housing and to the exterior of the inlet nozzle, wherein the evacuation pipe is configured to evacuate fluid out of the housing, wherein at least a portion of the evacuation pipe extends in a direction parallel to the longitudinal direction of the inlet body, wherein the portion of the evacuation pipe is formed by a groove arranged on a radially outwardly facing external surface of the inlet nozzle, and wherein the groove faces the internal surface of the external casing, the method for production of the fuel injector comprising:

inserting the gasket into the housing; and deforming the housing so as to incline the two opposite walls relative to one another in the direction of the opening.

6. The fuel injector according to claim 1, wherein the opening leads downstream to the inlet body.

7. The fuel injector according to claim 1, wherein the opening is directed in a direction which is parallel to the longitudinal direction of the inlet body.

* * * * *